(12) United States Patent
Vuong et al.

(10) Patent No.: US 6,430,578 B1
(45) Date of Patent: Aug. 6, 2002

(54) NAME SERVICE FOR NETWORK MANAGEMENT ARCHITECTURE

(75) Inventors: Tony Vuong, Fremont; Subodh Bapat, Palo Alto; Rajeev Angal, Santa Clara, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/205,323

(22) Filed: Dec. 4, 1998

(51) Int. Cl.[7] .............................................. G06F 17/30
(52) U.S. Cl. ...................... 707/203; 707/10; 709/203; 709/220; 709/226; 709/233
(58) Field of Search ........................... 707/103, 9, 220, 707/10, 203; 709/229, 201, 220, 203, 226, 233; 380/300

(56) References Cited

U.S. PATENT DOCUMENTS

| | | | | |
|---|---|---|---|---|
| 5,317,742 A | * | 5/1994 | Bapat | 709/300 |
| 5,414,812 A | * | 5/1995 | Filip et al. | 707/103 |
| 5,475,819 A | * | 12/1995 | Miller et al. | 709/203 |
| 5,483,652 A | * | 1/1996 | Sudama et al. | 707/10 |
| 5,696,697 A | * | 12/1997 | Blau et al. | 707/103 |
| 5,999,179 A | * | 12/1999 | Kekic et al. | 345/349 |
| 6,058,191 A | * | 5/2000 | Quan | 380/203 |
| 6,058,426 A | * | 5/2000 | Godwin et al. | 709/229 |
| 6,157,927 A | * | 12/2000 | Schaefer et al. | 707/103 |
| 6,167,427 A | * | 12/2000 | Rabinovich et al. | 709/201 |
| 6,226,979 B1 | * | 5/2001 | Gupta | 709/230 |
| 6,236,996 B1 | * | 5/2001 | Bapat et al. | 707/9 |
| 6,243,746 B1 | * | 6/2001 | Sondur et al. | 709/220 |
| 6,298,378 B1 | * | 10/2001 | Angal et al. | 709/223 |
| 6,301,624 B1 | * | 10/2001 | Lee et al. | 709/318 |
| 2001/0032256 A1 | * | 10/2001 | Sondur et al. | 709/223 |
| 2002/0013846 A1 | * | 1/2002 | Vuong et al. | 709/226 |

OTHER PUBLICATIONS

Bapat, Subodh, "Optimizing OSI Management System Performance," IEEE, 1992, pp. 149–159.*

Bapat et al., "Reasoning About Digital Systems Using Temporal Logic," IEEE, Jul. 29, 1986, pp. 215–219.*

* cited by examiner

Primary Examiner—Charles L. Rones
(74) Attorney, Agent, or Firm—Beyer Weaver & Thomas LLP

(57) ABSTRACT

A method for determining, storing, and managing names for agents and entities installed on a computer network is described. In one embodiment, a method is provided for providing a name service configured to provide unique identifiers and addresses for processes on a computer network. The name service includes a database of identifiers and addresses for the processes. A query is made to the name service that searches the database and the name service returns the answer.

5 Claims, 10 Drawing Sheets

NAME SERVICE FOR NETWORK MANAGEMENT ARCHITECTURE

BACKGROUND OF THE INVENTION

1. Field of the Invention

The present invention relates to computer network architectures, and, more specifically, to software for managing computer networks. More particularly, the present invention provides software, systems, and apparatus for managing software entities over a computer network. The present invention has applications in the areas of computer science, computer network management, and computer software.

2. The Related Art

The demands on computer network managers have grown exponentially as the size and extensiveness of computer networks has grown over the past decade. Starting from the relatively simple task of maintaining communication among a relatively small number of mainframe computers, network managers must now coordinate operations among thousands of computers, printers, servers, and other networked devices. With the advent of the Java® and Jini™ programming languages, even household devices will soon become linked over computer networks running on household "intranets" that in turn are linked to the worldwide Internet. Thus, there appears to be no end in sight to the increasing burden on network managers.

To control and coordinate the software associated with the myriad of networked computers and other devices, network managers employ software designed to track, establish communications with, and control various software agents that represent the networked devices. The term "agent" as used herein defines computer code used to manage a hardware device or software entity on the network. Agents typically provide data about the state of a device or entity represented by the agent in addition to providing a gateway to communicating with the device or entity using a software application running on a networked computer. The software used by the network manager interacts with various "platform-level" software services to enable the network manager to locate and interact with the various agents running on the network.

One requirement for establishing communication between an application being used by a network manager to interact with an agent is determining the network address of the agent. In some network managers, this necessary address information is maintained in a flat configuration file that holds the address information for all entities and agents on the network. Thus, the address information must be retrieved from the configuration file before a connection can be established with the agent or entity. While this approach is adequate for many networks, it presents scaling and efficiency for large networks on which run many entities, agents, and other software processes. In addition, maintenance of file names and other identification information is complex in such a system, as changes to such information cannot be propagated dynamically to all services using this information.

Thus, there is a need for network management software, systems, and methods that provide mechanisms for storing address information that are efficient, and scalable. Moreover, such software, systems, and methods should be capable of running on server computers independently of the other platform-level services. The present invention meets these and other needs.

SUMMARY OF THE INVENTION

The present invention provides software, systems, and methods for storing address information about entities and agents installed on a computer network that is are efficient, and scalable. The software provided by the present invention if further capable of running on server computers independently of the other platform-level services. Thus, the software, systems, and methods of the present invention will be recognized as being robust.

In one aspect, the present invention provides a method for determining, storing, and managing names for agents and entities installed on a computer network. In one embodiment, the method of the invention includes providing a name service configured to provide unique identifiers and addresses for processes on a computer network. The name service includes a database of identifiers and addresses for the processes. A query is made to the name service that searches the database and returns the answer.

In another embodiment, the name service also installs an agent or entity on the network. More particularly, the entity or agent is registered with the name service. This can be done by a message to the name service or by use of an API. In one embodiment, the name service determines if the agent or entity is part of the network infrastructure, and supplies a unique name to the agent or entity if the agent or entity does not provide such a name. In still another embodiment, the name service updates interested entities or agents of changes to the database entries of the subject being queried.

In another aspect, the present invention provides a system for managing names and identities of processes running on a computer network. In one embodiment, the system provided by the present invention includes a name service mechanism. The name service mechanism is configured to provide unique identifiers and addresses for processes on a computer network, and includes a database of identifiers and addresses for the processes as well as a query facility for performing queries on the database. The identifiers and addresses of the agents and processes include a type identifier, a version identifier, and an address. These can be of the AETitle format. In another embodiment, name service further includes a receiver configured to accept a name from a process on the computer network and a comparator configured to determine whether the process is a component of the computer management infrastructure for the computer network.

In other aspects, the present invention provides computer-readable media and data signals on a carrier wave containing instructions a. providing a name service configured to enable a computer to provide unique identifiers and addresses for processes on a computer network; provide a database of identifiers and addresses for the processes; and process a query of the database.

These and other aspects and advantages will become apparent when the Description below is read in conjunction with the accompanying Drawings.

BRIEF DESCRIPTION OF THE DRAWINGS

FIG. 4A illustrates step 308 of FIG. 3 in greater detail. FIG. 4B illustrates step 408 of FIG. 4A in greater detail.

DESCRIPTION OF SOME EMBODIMENTS OF THE INVENTION

The present invention provides software, systems, and methods for providing address and other identification information for processes (i.e., entities and agents) running on a computer network. Such software, systems, and methods will be referred to herein collectively as a "name service". The name service provided by the present invention is an efficient and scalable service for identifying processes running on a computer network. Moreover, the name service provided by the present invention is easily implemented in a modular software design as described more fully hereinbelow.

Figure 1:
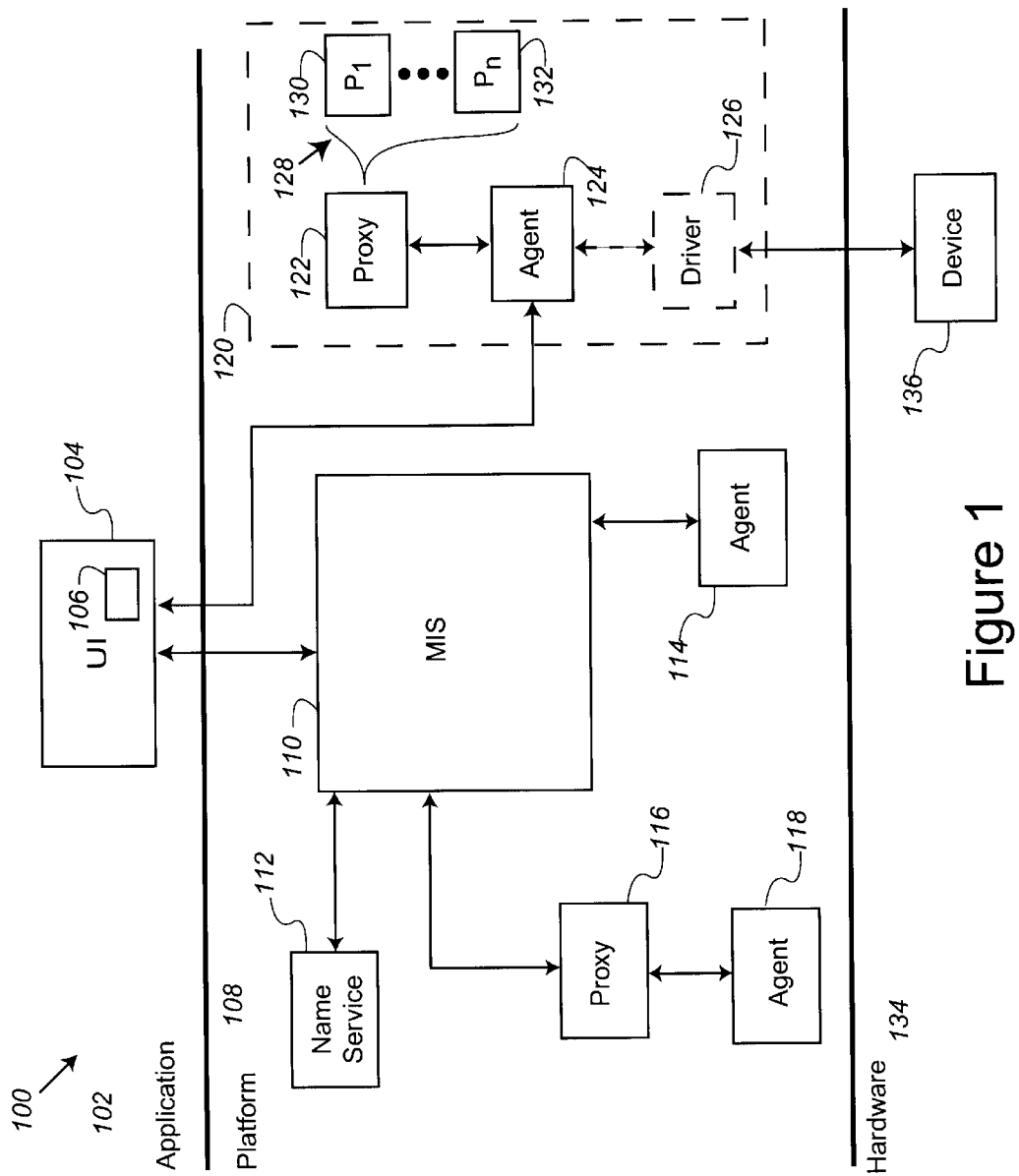
FIG. 1 illustrates one embodiment of a network management architecture in accordance with present invention.

FIG. 1 illustrates various software and hardware network elements relevant to the present invention at 100. These elements have been categorized into a crude hierarchy including "application level" elements 102, "hardware level" elements 134, and "platform level" elements 108. Application level elements include software user interface ("UI") applications 104 used to allow network managers to identify and interact with various software and hardware elements installed on the network. Such applications include, but are not limited to, network monitoring software, network diagnostic software, and hardware configuration and control software. Hardware level elements include devices such as device 136. Examples of devices include routers, severs, modems, computers, printers, network interface cards, and hubs. Still more examples of applications and devices will be apparent to those having skill in the computer science and computer network arts.

Between the application and hardware levels is the platform level 108. Platform level 108 contains a wide variety of software, also know as "platform level elements", used to control the computer network and the devices attached thereto. According to one embodiment of the present invention, the platform layer includes a management information service ("MIS") 110 that, among other functions, enables communication between application 104 and various processes and entities on the network. A Name service 112 communicates with MIS 110. Each of these services can be implemented in a single process or in separate, modular processes. In the latter embodiment, the processes can run on separate processors. As described in greater detail below, one function of Name service 112 is to provide address and identity information necessary for establishing communication between application 106 and software entities running in the platform layer. In one embodiment, Name service 112 maintains a database holding identification and addressing information for entities installed on the network, regardless as to whether the entity is one of the application, hardware, or platform level elements. More particularly the database controlled by the Name service is an object-oriented database. In one embodiment, the Name Service comprises a database of objects in which each entity on the network is represented by a single object in the database.

The entities managed by MIS 110 also include agents that are direct contact with the MIS, such as agent 114. For example, in one embodiment, agent 114 is a management protocol adapter ("MPA") such as described in currently pending U.S. patent application Ser. No. 09/205,325. In some cases, communication with the agent can be done via a proxy, such as proxy 116 that serves agent 118. For example, the combination of proxy 116 and agent 118 can together provide a management domain of managed objects such as a CMIP-management domain of GDMO-managed objects. In other cases, MIS 110 can communicate with a series of entities such as those shown generally at 120, including a proxy 122 that serves an agent 124 that communicates with device 136, optionally via a driver 126. Proxy 122 can, in turn, comprise several proxies denoted $P_1$, ..., $P_n$, each of which handles a different communications protocol. The operation and organization of these entities, as well as other suitable configurations, will be familiar to those of skill in the computer science and network arts.

Figure 2:
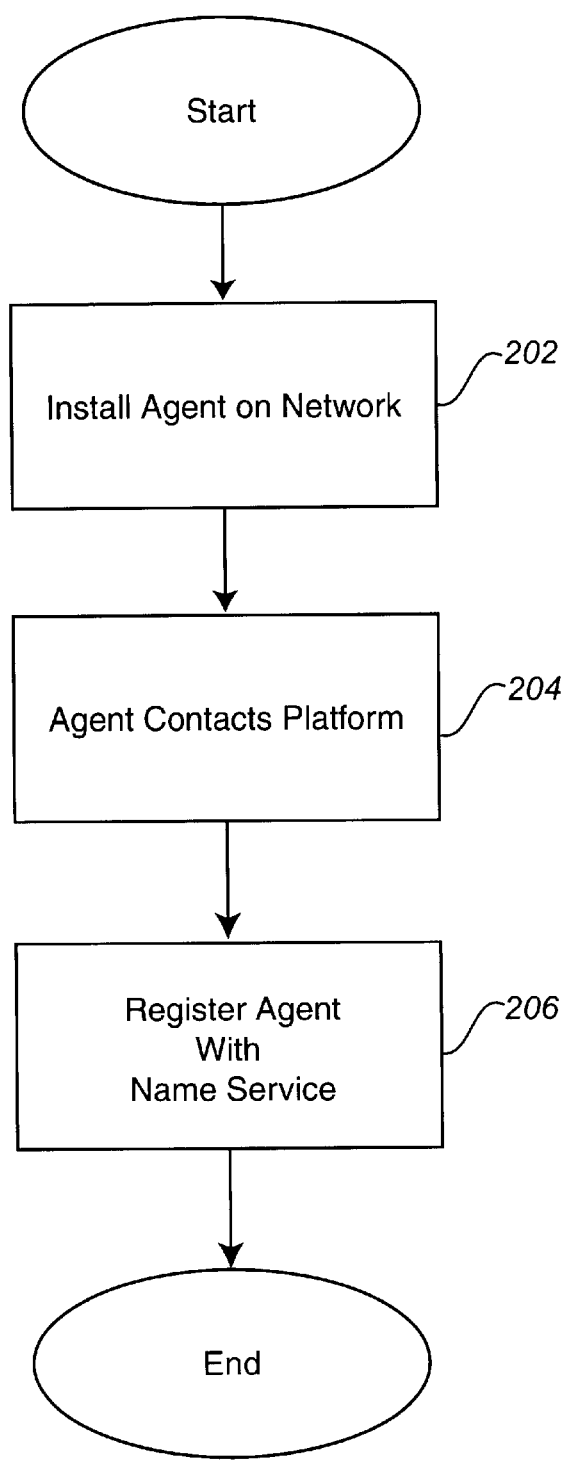
FIG. 2 illustrates an embodiment of a network administration name service in accordance with one embodiment of the present invention.

The operation of the name service of the invention, such name service 112 of FIG. 1, is shown in FIG. 2. At step 202 an agent is installed on the network. The details of the installation of the agent are not important to the present invention and generally will depend on the nature of the agent (e.g., whether the agent is associated with a hardware device). For example, the agent can be installed on the network using various installation software configured to create any necessary directories on one or more storage locations for the agent to use on the network, copy the software required for the agent to function therein, and launch the agent. Such details will be familiar to those of skill in the computer science and network arts. At step 204 the installed agent contacts the platform to notify the platform of the availability of the agent and any device(s) associated with the agent. For example, the agent can contact MIS 110, which, in turn, can notify other network applications, servers, and the like of the installation of the agent. In one embodiment, such notification is performed using an Event Distribution System as described in U.S. Pat. No. 6,298,378 issued on Oct. 2, 2001. Generally, the agent contacts the platform when it begins operation. Again, such details will be familiar to those of skill in the computer science and network arts. At step 206 the agent registers its name and other identification and address information with the Name Service 112. This step can be performed directly by interaction between the agent and the Name Service, or, alternatively, this step can be performed indirectly using a proxy for the agent. In one embodiment, the Name Service broadcasts this information to other services and/or entities on the network. In another embodiment, the Name Service passes this information to a separate service that performs such broadcasting.

Figure 3:
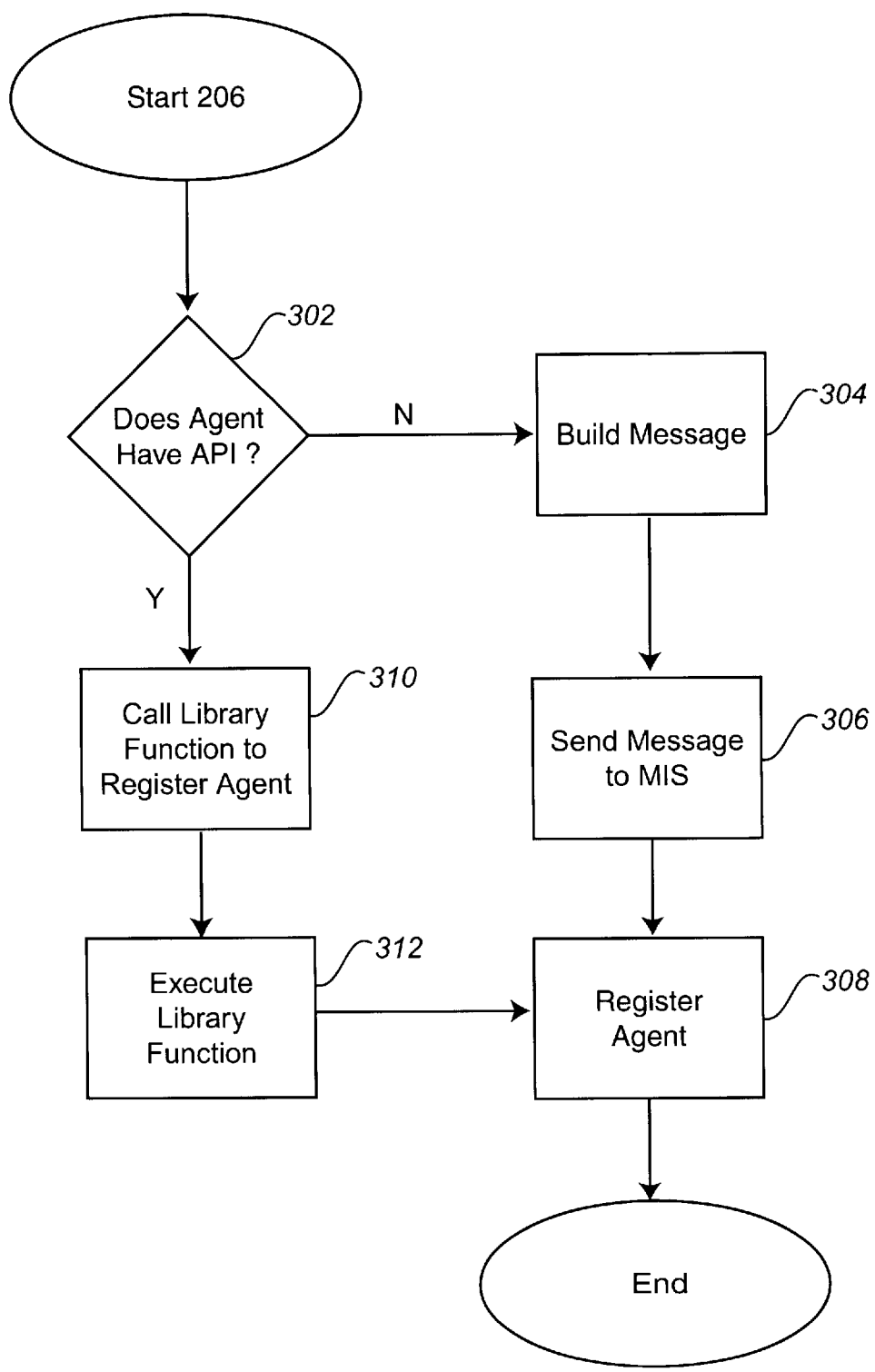
FIG. 3 illustrates step 206 of FIG. 2 and greater detail.

The details of step 206 are set forth in greater detail in FIG. 3. Beginning at step 302 a determination is made whether the agent has an application program interface ("API") configured to facilitate the programming of communications logic to communicate and perform registration with the Name Service. If no such API is present, then, at step 304, the agent builds a protocol message to Name Service 112 with the information necessary for registration. At step 306 this message is forwarded to the Name Service, and after a series of protocol message exchanges, at step 308, the agent is registered. Alternatively, if an API facility for communication to the Name Service is available then, at step 310, a library function configured to perform registration is called and executed at step 312. In one embodiment, this is accomplished using extensions to a library of portable management interface ("PMI") functions. The flow then moves to step 308 in which the agent is registered as just described. Those of skill in the computer science and network arts will appreciate the latter pathway may be more efficient for users to implement under some circumstances. For example, typically the agent will have to query the MIS repeatedly to obtain the address for the Name Service in order to send a request message to that service if no API is present. This can increase network and computation overhead and decrease network performance especially in large, complex networks.

Figure 4A:
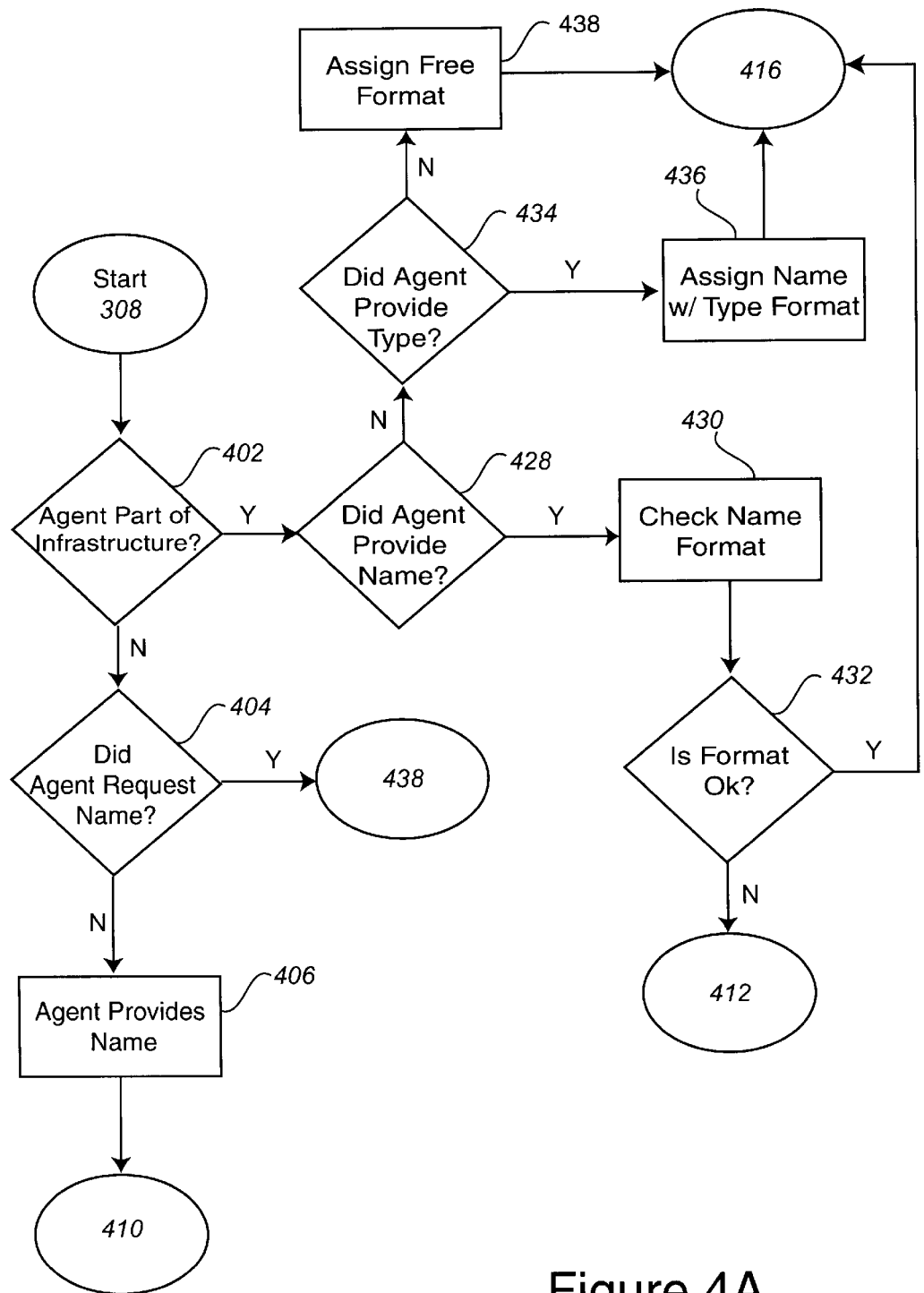
FIG. 4A and FIG. 4B illustrate the registration of an agent.
Figure 4B:
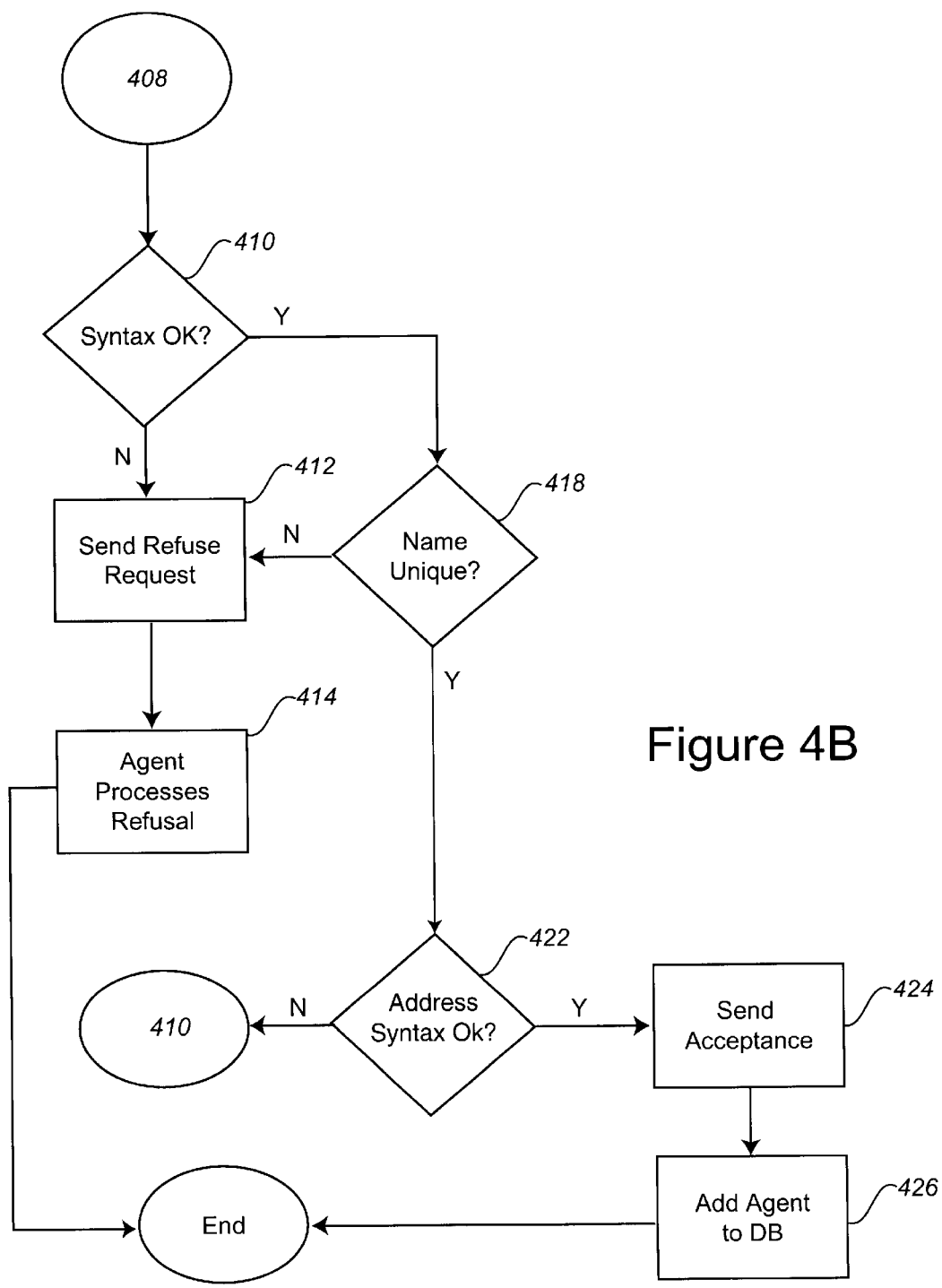

One embodiment of the implementation of step 308 is illustrated in greater detail in FIGS. 4A and 4B. According to this embodiment, agents that are part of the network management infrastructure (e.g., MPAs such as described in the above-referenced currently pending U.S. patent application Ser. No. 09/205,325) are coded with names having a specific information encoding that includes an agent name and an agent type. Thus, starting at 402 in FIG. 4A, a determination is made whether the agent is part of the network infrastructure. If the agent is not part of the network infrastructure, then, at step 404, a determination is made whether the agent requested a name from the Name Service. Otherwise, the flow moves to step 428 as described in greater detail below. At step 404 (the "no" branch of the query at step 402), a determination is made whether the agent has requested a name from the Name Service. If the agent did not request a name (i.e., the answer at step 404 was "no"), then, at step 406, the agent provides a name. Otherwise, the process moves to step 438.

The syntax of the name is checked for consistency with the convention used by the Name Service at step 410 in FIG. 4B. Those having skill in the computer science and network arts will recognize that any naming convention useful for network management can be used in conjunction with the present invention. One particular example of a useful naming convention is that known as Application Entity Title ("AETitle"). The application of the AETitle convention to the service provided by the present invention will be described in greater detail below. AETitle can be implemented using three different syntaxes, a "distinguished naming" syntax, a "local naming" syntax, and an object identifier "OID" syntax. In one embodiment, the AETitle is implemented using the OID syntax. In another embodiment, the name includes an agent type field, an agent version field, and an agent address field. The inclusion of an agent type field allows the Name Server to provide sorting and counting operations over various agents. An agent version field facilitates managing software version compatibility issues. The address field enables pinging and other contacts with the agent. In one embodiment, the address is the agent's IP address. If the name syntax fails the check at step 410, then, at step 412, the Name Service sends as "refuse request" message to the agent, which processes the message at step 414. For example, the agent can commit "suicide" (i.e., initiate a de-installation process). Alternatively, the agent can request the Name Service to provide a name as described below.

If, however, the syntax of the name is consistent (i.e., the determination at step 410 is "yes"), then, at step 418, the name is checked for uniqueness. If the name is not unique, then the flow returns to step 412 as described above. Otherwise, the address syntax provided by the name is checked at step 422. If the address syntax fails the check at step 422, then the flow moves to step 412 as described above. Otherwise, an "acceptance message" is sent to the agent at step 424 and the agent name is added to the database at step 426. In one embodiment, the type of storage can also be specified for the database entry. For example, the entry can be made persistent or volatile, global or local. If the database entry is global, then any name supplied to or created by the Name Server is checked for uniqueness against all Name Servers installed on the network. If the entry is local, then uniqueness is checked against that Name Server's database only. In addition, the Name Service can forward queries to name directories external to the network management software and retrieve responses from such directories. For example, the Name Service can forward a name query to a third-party directory search engine, such as provided by Yahoo! or Excite, and retrieve the query result for network management use. Thus, the Name Service can be used as a name resolution gateway for names both internal and external to the network.

Returning to FIG. 4A, the "yes" branch of step 404 will now be explored. If the agent requests a name from the Name Service, then the flow of process operations moves to step 438 where a name is assigned to the agent by the Name Service. In one embodiment, the name is assigned using a "free format" that includes at least a "free" type and the agent's version (the agent's address can be determined separately). As noted above, in one embodiment, the name has the AETitle format. The process flow then moves to step 418 (FIG. 4B) as described above.

Continuing with FIG. 4A, the "yes" branch of step 402 will now be traced. If the agent is part of the network infrastructure, then, at step 428, a determination is made whether the agent provided a name to the Name Service. If the agent provided a name (i.e., the answer is "yes"), then the process flow moves to step 430 where the name format is checked. If the format is correct, then the flow moves to step 418 as described above; otherwise, the flow moves to step 412, also described above.

If the determination at step 428 is "no" (i.e., the agent did not provide a name), then, at step 434, a determination is made whether the agent provided a type. If the agent did not provide a type, then a name is assigned in step 438 as described above. Otherwise, a name is assigned using the parameters discussed above at step 436. In either case, the flow then moves to step 418.

Figure 5:
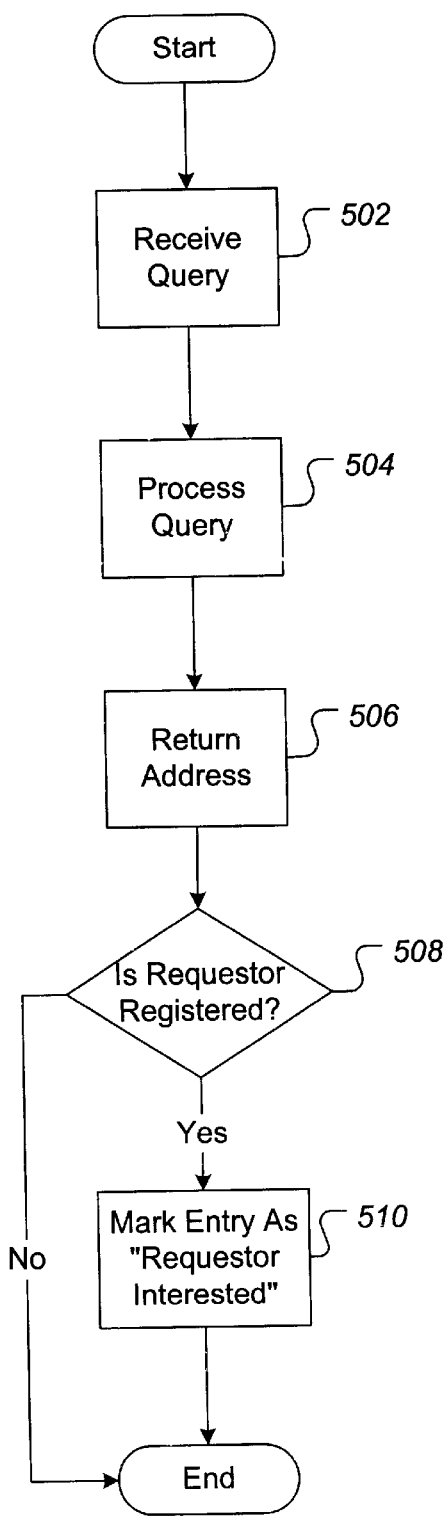
FIG. 5 illustrates the operation of a network administration name service according one embodiment of the invention.

In one embodiment, the Name Service provided by the present invention can respond to relatively sophisticated queries as illustrated in FIG. 5. At step 502 the Name Service receives a query from an application or other server. In one embodiment, the query can be made on the local database or globally on all Name Service databases. Alternatively, the query can be defined over only a subset of Name Service databases. The query syntax can include prefixes, suffixes, infixes, full or partial names (using wildcards). The query can also be constructed using Boolean operations (e.g., the operations AND and OR), or GREP. The Name Service performs the search as instructed at step 504, and, at step 506, returns the results to the requester. At step 508, the Name Service checks to determine whether the entity that queried the Name Service (the "requester") was registered as described above. If the requestor is registered (following the "yes" branch), then the Name Service marks the requestor as "interested" in the queried entity at 510. The requestor will then receive any updates or changes made to the entity's database entry. The extent and scope of these updates can be varied as determined by one of skill in the computer science and network arts. The process then terminates following step 510 or if the requestor was determined to be unregistered at step 508 (i.e., following the "no" branch).

Figure 6:
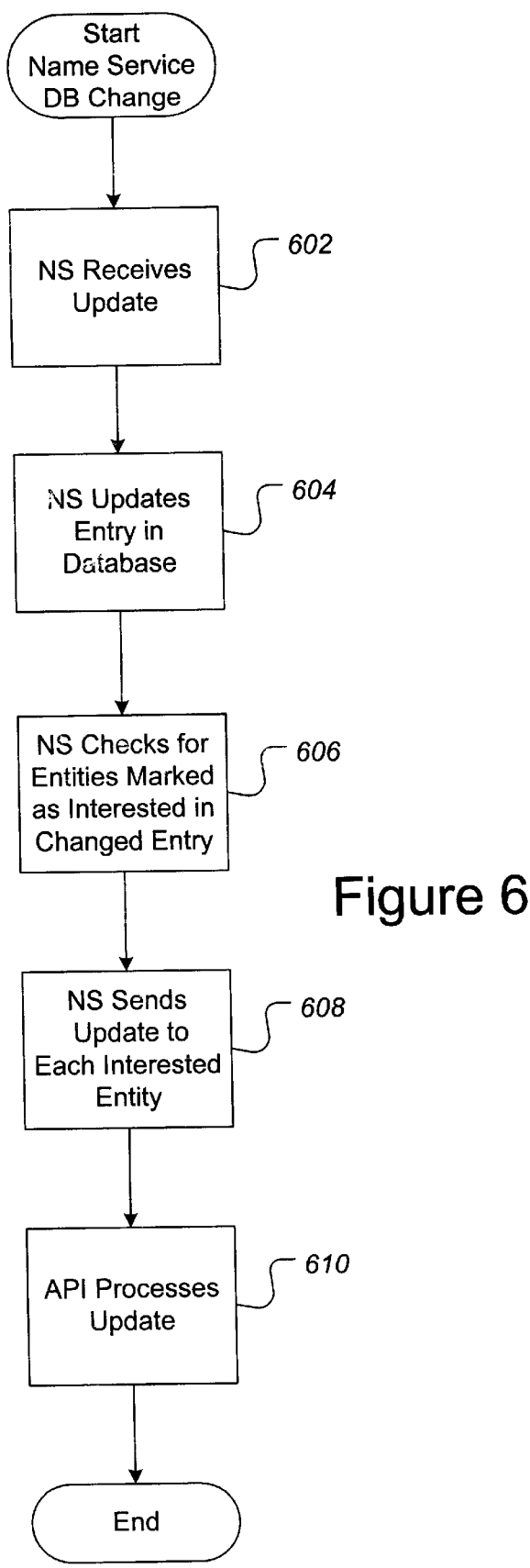
FIG. 6 illustrates updating interested entities in database changes made by the name service according to one embodiment of the invention.

FIG. 6 illustrates an embodiment in which the Name Service provided by the present invention forwards updates to changes made to entries in the database. Starting at 602, the Name Service receives an update to a database entry. Such an update can come from any entity, including the UI application 102 shown in FIG. 1. For example, the network manager operating UI 102 could change the name of a drive on the network. At step 604, the Name Service updates the database entry and, at step 606, the Name Service checks for any entities that have been marked as "interested" in the changed entry (see step 510 of FIG. 5 above). The Name Service then sends updates to any interested entities at step 608. At step 610, the API of each interested entity processes the update (e.g., by updating a cache in the interested entity).

Figure 7:
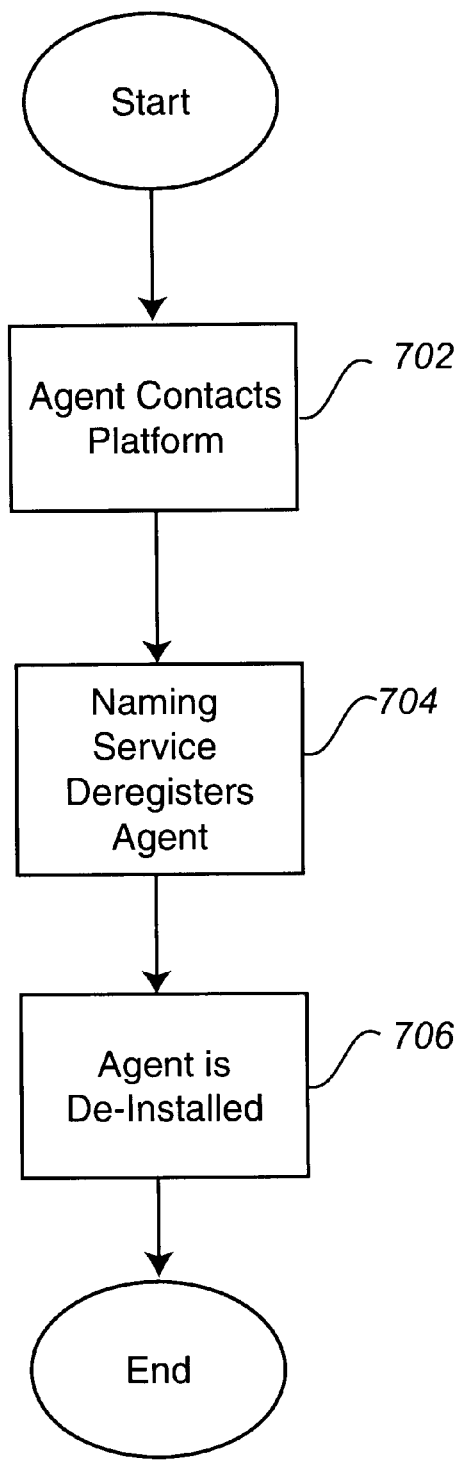
FIG. 7 illustrates the removal of an agent from a name service in accordance with one embodiment of the present invention.

FIG. 7 illustrates an embodiment of the present invention for situations in which an agent's Name Service database entry is removed. This can occur, for example, when a device is removed from the network necessitating the removal of any associated driver(s) and agent(s), or when an agent is updated with a newer version. At step 702 the agent to be de-installed contacts the Name Service, either directly or by proxy as discussed above. At step 704, the database entry for the agent being de-registered is removed. This can be done by analogy to the registration process described above, i.e., the agent can contact the Name Server by using an appropriate API or by creating a message having the appropriate information for de-registration. The Name Service then checks the agent's name against the database entries (either globally or locally as necessary). If a match is found, then the database entry is removed; otherwise, an exception is thrown. Finally, at step 706, the agent is de-installed as appropriate for the particular platform.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general-purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; holographic storage arrays, and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 8:
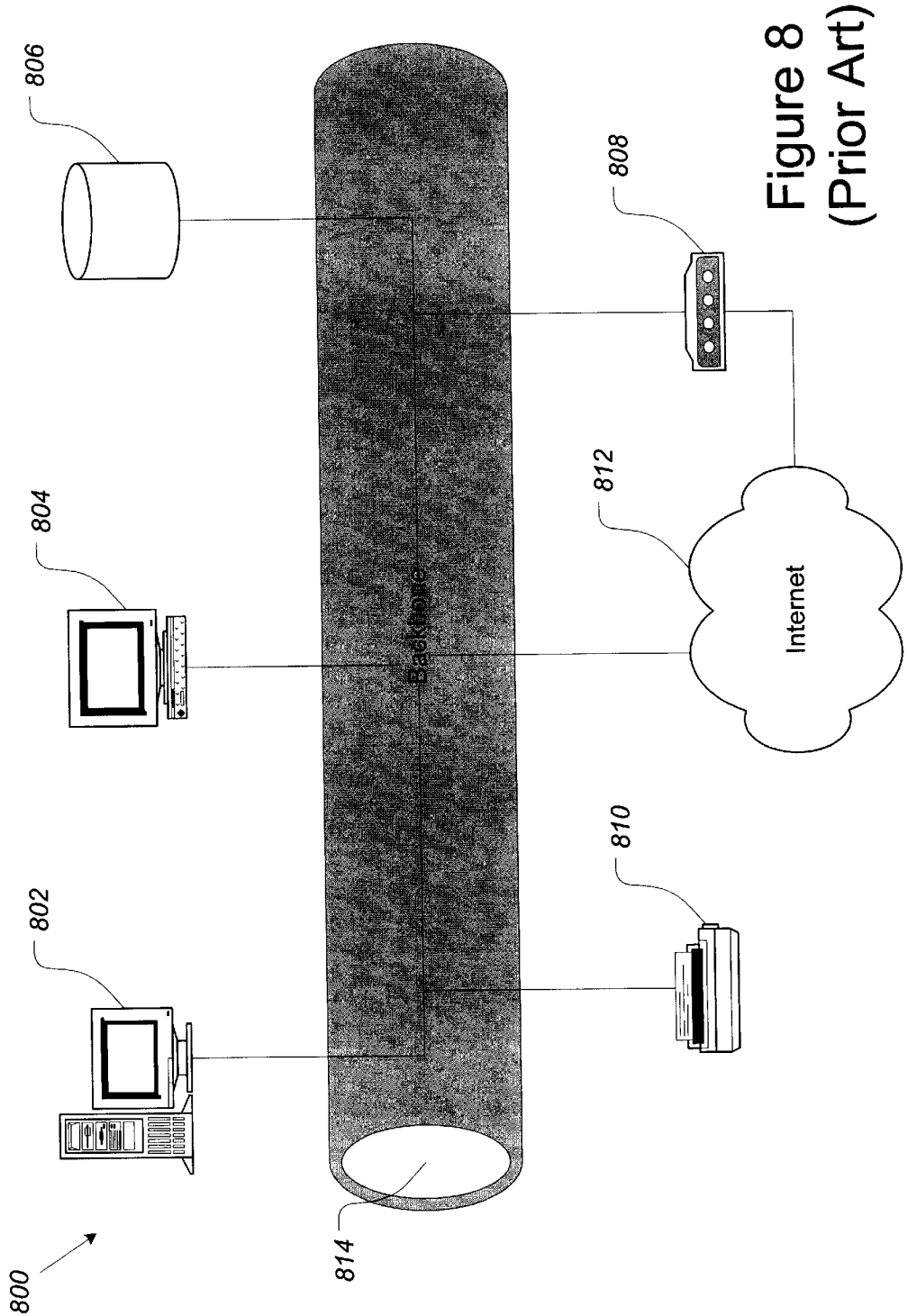
FIG. 8 prior art, illustrates a computer network.

The present invention further relates to computer networks such as illustrated at 800 in FIG. 8. There, a server 802 (which can be a plurality of servers depending on the network configuration) provides network data and management resources for operating network 800. In one embodiment, the network management software provided by the present invention, in particular, the above-described Name Service is installed and operated from server 802. Various devices and entities reside on and communicate over the network. These devices and entities include, but are not limited to, client computers 804, data storage devices 806, modems and other communications devices 808, printers other hardcopy input/output devices 810, and connections to the Internet (which is shown generally at 812). All of these devices communicate with each other over network backbone 814. Still other common network devices not shown include hub, routers, packet switchers, switches, hosts, bridges and the like. As noted above, each of these devices can include one or more drivers, agents, and/or proxies that are managed by network management computers such as illustrated at 802.

Figure 9:
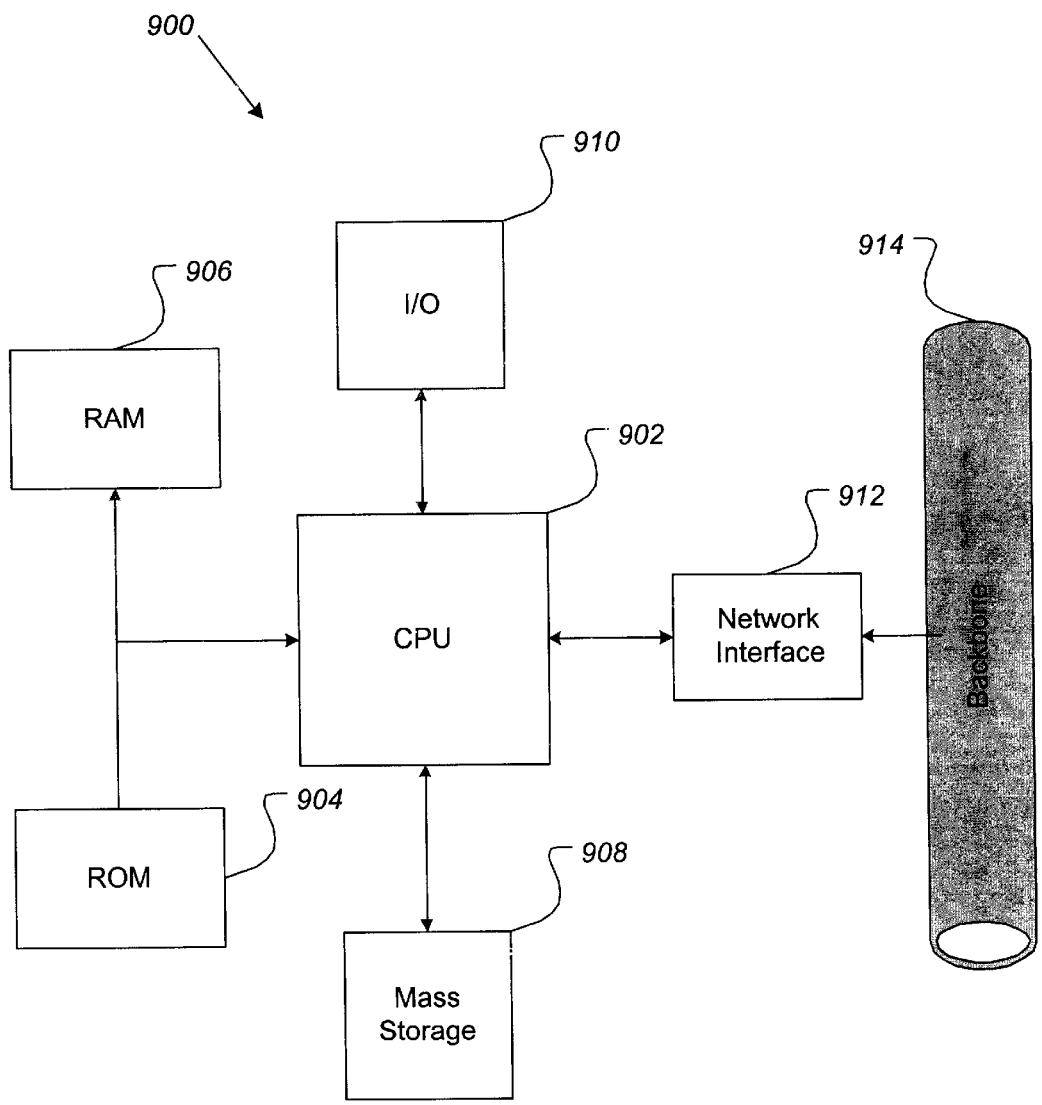
FIG. 9 prior art, illustrates a computer system.

FIG. 9 at 900 shows a typical computer-based system in accordance with the present invention. Shown is a central processing unit 902 (CPU) which is coupled to memory devices including read only memory 904 (ROM) and random access memory 906 (RAM). As is well known in the art, ROM 904 acts to transfer data and instructions unidirectionally to the CPU and RAM 906 is used typically to transfer data and instructions in a bidirectional manner. A mass memory device 908 is also coupled bidirectionally to CPU 902 and provides additional data storage capacity. The mass memory device 908 may be used to store programs, data and the like and may take the form of a magnetic or paper tape reader or some other well known device (e.g., CD-ROM). It will be appreciated that the information retained within the mass memory device 908, may, in appropriate cases, be incorporated in standard fashion as part of RAM 906 in the form of virtual memory. CPU 902 is also coupled to one or more input/output devices 910 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally can be coupled to a computer or telecommunications network 914 using a network connection as shown generally at 912. The above-described devices and materials will be familiar to those of skill in the computer hardware and software arts (see, e.g., Ralston, Anthony, and Reilly, Edwin D. 1993. Encyclopedia of Computer Science. Van Norstrand Reinhold; Herzog, James H. 1996. Design and Organization of Computing Structures. Franklin, Beedle & Associates, Inc.; Stone, Harold S. 1983. Microcomputer Interfacing. Addison Wesley; Martin, James, and Chapman, Kathleen K. 1989. Local Area Networks: Architectures and Implementations. Prentice Hall.)

Conclusion

Thus, the present invention will be seen to provide an efficient, scalable, and modular software, systems, and methods for providing address and identification information for agents and entities on a computer network. Using the software, systems, and methods described herein name services large, complex networks can be implemented efficiently.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many steps of processing can be implemented in a sequence different from that described herein without altering the invention. In addition, various naming conventions can be used in conjunction with the naming service without significant change to the systems, software, or methods described herein.

What is claimed:

1. A system for managing names and identities of processes running on a computer network comprising:
   a. a name service mechanism configured to provide unique identifiers and addresses for processes on a computer network, said name service including a database of identifiers and addresses for said processes and a query facility for performing queries on said database;
   b. a network management facility that coordinates communications among processes running on said computer network; and
   c. a process running on said network having a corresponding entry in said database, wherein said name service is configured to manage and respond to queries from a database containing information about named entities on said network, and said name service is further configured to mark an entity making queries about another entity in the database as interested if said querying entity is registered, and updating said interested entity of further changes made to the queried entity.

2. A method for determining, storing, and managing names for agents and entities installed on a computer network, comprising the steps of:
   a. providing a name service configured to provide unique identifiers and addresses for processes on a computer network, said name service including a database of identifiers and addresses for said processes;
   b. installing an agent or entity on the network;
   c. registering said agent or entity with said name service;
   d. contacting said name service with a query;
   e. searching said database using name service to answer said query; and
   f. returning said answer using said name service, wherein said step of registration includes the sub-steps of:
      a. determining whether said agent or entity includes an API configured to access a library of functions for registering said agent or entity with said name service;
      b. calling said library and executing said functions for registering said agent or entity with said name service if said agent or entity includes said API; and
      c. constructing and forwarding to said name server a message including registration information if said agent or entity lacks said API.

3. The method of claim 2, wherein said step of registering said agent or entity includes the sub-steps of:
   a. determining whether said agent or entity is a component of network management software infrastructure;
   b. checking the format of said name for uniqueness and syntax; and
   c. providing a name using said name server if said agent or entity did not provide a name.

4. The method of claim 3, further including the steps of:
   a. determining whether said agent or entity has provided a name if said agent or entity is a network management software infrastructure component;
   b. determining whether said agent or entity has provided a type if said agent or entity is a network management software infrastructure component; and
   c. determining whether agent or entity requested a name from said name service if said agent or entity is not a network management software infrastructure component.

5. The method of claim 3, further including the steps of:
   a. sending an exception if said format is incorrect; and
   b. processing said exception using said agent or entity.

* * * * *